United States Patent
Cusack et al.

[11] Patent Number: 6,150,447
[45] Date of Patent: Nov. 21, 2000

[54] FIRE RETARDANT METAL STANNATE COATED INORGANIC FILLERS

[75] Inventors: Paul Andrew Cusack, Iver Heath; Bhagwati Patel, South Harrow; Manider Singh Heer, Hayes; Rupert Guy Baggaley, Calne, all of United Kingdom

[73] Assignee: ITRI Limited, Uxbridge, United Kingdom

[21] Appl. No.: 08/981,379

[22] PCT Filed: Jun. 20, 1996

[86] PCT No.: PCT/GB96/01475

§ 371 Date: Mar. 19, 1998

§ 102(e) Date: Mar. 19, 1998

[87] PCT Pub. No.: WO97/00909

PCT Pub. Date: Jan. 9, 1997

[30] Foreign Application Priority Data

Jun. 22, 1995 [GB] United Kingdom .................. 9512690
Oct. 9, 1995 [GB] United Kingdom .................. 9520598

[51] Int. Cl.$^7$ .......................... C09K 21/02; C09C 3/06; B05D 5/00; C01G 19/02
[52] U.S. Cl. .......................... 524/413; 524/401; 524/435; 524/436; 252/609; 252/610; 423/92; 423/274; 427/212
[58] Field of Search .......................... 524/401, 413, 524/436, 435; 252/609, 610; 427/212; 423/92, 274

[56] References Cited

U.S. PATENT DOCUMENTS

| 4,146,669 | 3/1979 | Dikler . |
| 5,093,199 | 3/1992 | Staendeke et al. ...................... 428/403 |

FOREIGN PATENT DOCUMENTS

| 0156196 | 10/1985 | European Pat. Off. . |
| 0 333 506 | 9/1989 | European Pat. Off. . |
| 0459552 A1 | 12/1991 | European Pat. Off. . |
| 0 630 950 | 12/1994 | European Pat. Off. .......... C09C 3/06 |
| 0630950 | 12/1994 | European Pat. Off. . |
| 321 063 | 12/1902 | France . |
| 1769688 | 6/1968 | Germany . |
| 60-199069 | 10/1985 | Japan .............................. C09C 1/28 |
| 62-050344 | 3/1987 | Japan .............................. C08J 5/18 |
| 546620 | 7/1942 | United Kingdom . |
| 696975 | 9/1953 | United Kingdom . |
| 2134094 | 8/1984 | United Kingdom . |
| 2 218 422 | 11/1989 | United Kingdom ............. C08K 9/00 |
| 2218422 | 11/1989 | United Kingdom . |
| WO 97/41303 | 11/1997 | WIPO . |

OTHER PUBLICATIONS

*Flame Retardant Polymeric Materials*, edited by M. Lewin, S.M. Atlas and E.M. Pearce, Plenum Press, New York 1975, pp. 82–84.

*The Industrial Uses of Tin Chemicals*, S.J. Blunden, P.A. Cusack and R. Hill, Royal Society of Chemistry, 1985 pp. 180 and 182.

Derwent Publications Ltd., London, GB; AN 88–094943; XP002013603 & JP,A,63 045 123 (Ishihara Sangyo Kaisha) Feb. 26, 1988.

Derwent Publications Ltd., London, GB; AN 87–104169; XP002013604 & JP,A,62 050 344 (Sumitomo Bakelite KK, Seiko Kasei KK) Mar. 5 1987.

*Primary Examiner*—David W. Wu
*Assistant Examiner*—Kelechi C. Egwim
*Attorney, Agent, or Firm*—Wolf, Greenfield & Sacks P.C.

[57] ABSTRACT

A process for the preparation of a fire-retardant material which comprises a particulate inorganic filler (other than a tin compound) coated with a layer of divalent metal hydroxystannate or a divalent metal stannate, which process comprises the steps of: (i) forming a slurry of the particulate inorganic filler in an aqueous solution of an alkali hydroxystannate, also containing a divalent metal oxide dissolved therein; (ii) reacting the slurry from step (i) with a hydrolysing agent, or a water-soluble source of a divalent metal, to form a layer of a divalent metal hydroxystannate on the surface of the filler, and (iii) optionally, heating the filler coat with hydroxystannate in step (ii) in order to convert it to the corresponding divalent metal stannate.

9 Claims, No Drawings

FIRE RETARDANT METAL STANNATE COATED INORGANIC FILLERS

The present invention is concerned with the preparation of fire retardant materials, polymer compositions containing such fire retardant materials, and novel fire retardant materials which may be produced by the process of the invention.

It is known to use tin compounds as non-toxic flame retardants and smoke suppressants for organic polymers. For example, tin compounds such as zinc hydroxystannate (ZHS), zinc stannate (ZS) and tin (IV) oxide ($SnO_2$) have been shown to have good flame-retardant/smoke-suppressant properties in halogen-containing polymer formulations such as PVC, neoprene and hypalon, and also in other plastics materials, such as polyester resins, epoxy resins and nylons, to which halogen compounds have been added-as flame-retardant additives. The non-toxic nature of the inorganic tin compounds, combined with their dual flame-retardant/smoke-suppressant activity, has generated interest in their use as alternatives to antimony trioxide in halogen-containing polymers.

Many relatively low cost inorganic compounds are added, at relatively high levels, into polymer compositions. In some cases these are added to extend the polymer (and to lower its overall volume cost) or to modify its physical properties. Examples of such inorganic compounds include calcium carbonate ($CaCO_3$) and silica ($SiO_2$). In addition, some other inorganic materials are added as active flame-retardant fillers so that their endothermic dehydration during combustion of the associated polymer withdraws heat from the system and the water vapour which is released serves to smother flame. Examples of these "active" fillers include aluminium hydroxide (usually employed in the form of alumina trihydrate (ATH)] and magnesium hydroxide [(Mg(OH)$_2$]. It has been proposed to incorporate tin compounds and such "active" fillers into polymeric systems (both halogen-containing and halogen-free) to serve as fire-retardant combinations.

It has been found that the use of filler powders comprising a particulate inorganic filler material, the particles of which are coated with a layer of a tin compound, gives improved fire-retardancy effects as compared with the use of comparable simple mixtures of the two components (filler and tin compound).

EP-A-0156196 discloses fire-retardant materials comprising particulate fillers coated with a layer of tin oxide. These fillers were prepared using aqueous acidic solutions of stannic chloride and these are not appropriate for treating many inorganic fillers, for example magnesium hydroxide or calcium carbonate, which are acid-soluble.

It has now been found, in accordance with the present invention, that it is possible to coat inorganic particulate substrates with tin compounds using, as starting materials, an alkaline coating solution comprising an alkali metal hydroxystannate, (e.g. sodium hydroxystannate or potassium hydroxystannate). Accordingly inorganic fillers such as ATH, Mg(OH)$_2$ or $CaCO_3$ may be coated using such a process. This process is, of course, also appropriate for coating tin compounds onto acid-insoluble substrates such as $TiO_2$ etc.

According to the present invention there is provided a process for the preparation of a fire-retardant material which comprises a particulate inorganic filler (other than a tin compound) coated with a layer of tin oxide or divalent metal hydroxystannate or a divalent metal stannate, which process comprises the steps of:

(i) forming a slurry of the particulate inorganic filler in an aqueous solution of an alkali hydroxystannate, optionally also containing a divalent metal oxide dissolved therein;

(ii) reacting the slurry from step (i) with a hydrolysing agent, or a water-soluble source of a divalent metal, to form a layer of tin oxide or of a divalent metal hydroxystannate on the surface of the filler; and (iii) optionally, heating the filler coated with hydroxystannate in step (ii) in order to convert it to the corresponding divalent metal stannate.

The invention also provides a polymer composition comprising a polymer and a fire retardant material produced by the process as defined above. Suitably, the particulate inorganic fire retardant material will be present in the polymer composition in an amount of from 5 to 400% by weight, based on the weight of polymeric material, preferably 20 to 200% by weight on the same basis. Further, the fire retardant material itself preferably contains the tin compound in an amount from 1 to 100%, preferably 5 to 50% by weight, based on the weight of the other inorganic material.

In accordance with one embodiment of the process of the invention, a coating of tin oxide is formed upon the surface of the particulate filler substrate by forming a slurry of the substrate in an aqueous solution of alkali metal hydroxystannate and then hydrolysing the hydroxystannate to tin oxide, for example by the action of urea or a dilute acid (e.g. nitric acid or hydrochloric acid). It is generally preferred to use urea as hydrolysing agent and, in this case, hydrolysis is suitably carried out at elevated temperature, e.g. about 85° C. When using acid as hydrolysing agent, this latter is preferably added dropwise to the slurry, with stirring, until a pH of about 7 is attained. This process may also be used to deposit a hydroxystannate upon the surface of the filler by including dissolved divalent metal oxide in the solution in which the filler is slurried, in which case the pH of the solution should be relatively high.

A further modification, applicable to processes using urea as the hydrolysing agent, involves adjustment of the pH of the slurry after the urea hydrolysis step. In such processes, the slurry is allowed to cool to room temperature and the pH is adjusted to between 7–8, by dropwise addition of dilute hydrochloric acid.

Metal hydroxystannates may also be deposited on the surface of the particulate inorganic substrate, in accordance with the invention, by forming a slurry of the material to be coated in an aqueous solution of alkali metal hydroxystannate and subsequently adding a soluble salt of the divalent metal, e.g. zinc nitrate, zinc acetate or, most preferably, zinc chloride or an equivalent salt of other metal such as magnesium, calcium, strontium, barium, iron, cobalt, nickel or copper. The product obtained is subsequently separated from the slurry and washed with distilled water to remove any soluble material and then dried at elevated temperature, e.g. 110° C.

In accordance with a modification of the method wherein the filler is coated with hydroxystannate, the product is further heated to elevated temperature, to 250–450° C., in order to convert the hydroxystannate to the corresponding metal stannate by dehydration. Materials containing a metal stannate coating are particularly useful as fire retardant additives for addition to polymers which are intended to be processed at temperatures above the decomposition temperature of the hydroxystannate.

Certain of the coated fillers which may be produced in accordance with the invention are themselves novel. Accordingly, a further embodiment of the invention provides a fire retardant material comprising a particulate inorganic filler (other than a tin compound) coated with a layer of a divalent metal hydroxy-stannate or stannate. The metal hydroxy-stannates may be represented by the formula MSN(OH)$_6$ (in which M is a divalent metal in desired form, for example, Zn, Mg, Ca, Sr, Ba, Fe, Co, Ni or Cu), especially zinc) and the metal stannates by the formula MSnO$_3$ (in which M has the meaning given above).

Typical examples of inorganic fillers include calcium carbonate, silica, titania, alumina tri-hydrate, magnesium hydroxide and the like. Suitably, the particles of the base inorganic filler will have an average particle size of from 0.1 to 100 μm, preferably 1 to 20 μm.

The polymer component of the composition may be any of a wide variety of materials, e.g. thermo-plastic, thermo-setting or elastomeric, particularly halogen containing polymers. The polymers may be in block or compounded form, e.g. in the form of paints or other coating compositions.

In order that the invention may be well understood, the following Examples are given by way of illustration only.

EXAMPLE 1

SnO$_2$—Coated Fillers 30 g Magnesium hydroxide were slurried by rapid stirring in 300 ml of an aqueous solution containing 2.2 g sodium hydroxystannate and 5 g urea. The slurry was heated to 85° C. and maintained at that temperature for 4 hours. After the reaction mixture had been allowed to cool to room temperature, the solid product was separated from the solution by centrifugation, washed three times with distilled water and dried in air at 110° C. The dried cake was crushed in a mortar and pestle to give 31 g (98% yield) of a fine white powder (CP1). This product analysed to a composition of 4.7% SnO$_2$+95.3% Mg(OH)$_2$, equivalent to a coating level of 4.9% w/w on the filler.

EXAMPLES 2 to 8

Further SnO$_2$ coated fillers (CP2–CP8) were prepared according to the method of Example 1, as detailed in Table 1 below:

TABLE 1

| Code | Filler | Na$_2$Sn(OH)$_6$ | Urea | Solution volume | Product yield | Analysed composition | Coating level |
| --- | --- | --- | --- | --- | --- | --- | --- |
| CP2 | 100 g Mg(OH)$_2$ | 15 g | 30 g | 1500 ml | 110 g (100%) | 8.8% SnO$_2$:91.2% Mg(OH)$_2$ | 9.6% w/w |
| CP3 | 30 g Mg(OH)$_2$ | 9 g | 20 g | 300 ml | 36 g (99%) | 16.4% SnO$_2$ + 83.6% Mg(OH)$_2$ | 19.6% w/w |
| CP4 | 30 g ATH | 2.2 g | 5 g | 300 ml | 28 g (89%) | 4.0% SnO$_2$ + 96.0% ATH | 4.2% w/w |
| CP5 | 100 g ATH | 15 g | 30 g | 1500 ml | 100 g (91%) | 7.0% SnO$_2$ + 93.0% ATH | 7.5% w/w |
| CP6 | 30 g ATH | 9 g | 20 g | 300 ml | 35 g (96%) | 16.2% SnO$_2$ + 83.8% ATH | 19.3% w/w |
| CP7 | 30 g CaCO$_3$ | 4.5 g | 10 g | 300 ml | 33 g (99%) | 9.0% SnO$_2$ + 91.0% CaCO$_3$ | 9.9% w/w |
| CPS | 30 g TiO$_2$ | 4.5 g | 10 g | 300 ml | 32 g (96%) | 8.8% SnO$_2$ + 91.2% TiO$_2$ | 9.6% w/w |

EXAMPLE 9

100 g Magnesium hydroxide were slurried by rapid stirring in 1000 ml of an aqueous solution containing 10 g sodium hydroxystannate at room temperature. An aqueous solution (100 ml) containing 5.1 g zinc chloride was added dropwise into the slurry and stirring was continued for a further 2 hours. The resulting solid product was separated from the solution by centrifugation, washed three times with distilled water and dried in air at 110° C. The dried cake was crushed in a mortar and pestle to give 111 g (100% yield) of a fine white powder (CP9). This product analysed to a composition of 9.9% ZHS (zinc hydroxystannate)+90.1% Mg(OH)$_2$, equivalent to a coating level of 11.0% w/w on the filler.

EXAMPLE 10

100 g Alumina trihydrate were slurried by rapid stirring in 1000 ml of an aqueous solution containing 7.5 g sodium hydroxystannate at room temperature. An aqueous solution (100 ml) containing 3.8 g zinc chloride was added dropwise into the slurry and stirring was continued for a further 2 hours. The resulting solid product was separated from the solution by centrifugation, washed three times with distilled water and dried in air at 110° C. The dried cake was crushed in a mortar and pestle to give 107 g (99% yield) of a fine white powder (CP10). This product analysed to a composition of 7.0% ZHS+93.0% ATH, equivalent to a coating level of 7.5% w/w on the filler.

EXAMPLE 11

100 g calcium carbonate were slurried by rapid stirring in 1500 ml of an aqueous solution containing 11.5 g potassium hydroxystannate, 3.1 g zinc oxide, 15.5 g potassium hydroxide and 23 g urea. The slurry was heated to 85° C. and maintained at that temperature for 4 hours. After the reaction mixture had been allowed to cool to room temperature, the solid product was separated from the solution by centrifugation, washed three times with distilled water and dried in air at 110° C. The dried cake was crushed in a mortar and pestle to give 107.1 g (96% yield) of a fine white powder. This product analysed to a composition of 9.7% ZHS+90.3% CaCO$_3$, equivalent to a coating level of 10.7% w/w on the filler.

EXAMPLE 12

250 g alumina trihydrate were slurried by rapid stirring in 4000 ml of an aqueous solution containing 28.8 g potassium hydroxystannate, 7.8 g zinc oxide, 38.8 potassium hydroxide and 57.5 g urea. The slurry was heated to 85° C. and maintained at that temperature for 4 hours. After the reaction mixture had been allowed to cool to room temperature, the pH of the slurry was measured to be 13.0. The solid product was separated from the solution by centrifugation, washed three times with distilled water and dried in air at 110° C. The dried cake was crushed in a mortar and pestle to give 255.3 g (92% yield) of a fine white powder (CP12). This product analysed to a composition of 10.2% ZHS+89.8% ATH, equivalent to a coating level of 11.4% w/w on the filler.

EXAMPLE 13

100 g alumina trihydrate were slurried by rapid stirring in 1500 ml of an aqueous solution containing 11.5 g potassium hydroxystannate, 3.1 g zinc oxide, 15.5 g potassium hydroxide and 23 g urea. The slurry was heated to 85° C. and maintained at that temperature for 4 hours. After the reaction mixture had been allowed to cool to room temperature, the pH of the slurry was adjusted to 8.0, by dropwise addition of dilute hydrochloric acid. The solid product was separated from the solution by centrifugation, washed three times with distilled water and dried in air at 110° C. The dried cake was crushed in a mortar and pestle to give 108.8 g (98% yield) of a fine white powder (CP13). This product analysed to a composition of 9.0% ZHS+91.0% ATH, equivalent to a coating level of 9.9% w/w on the filler.

EXAMPLE 14

The fire-retardant properties of certain of the coated fillers prepared above were investigated as follows:

The coated fillers, CP2 —Example 2 [$SnO_2$-coated $Mg(OH)_2$] and CP9 —Example 9 [ZHS-coated $Mg(OH)_2$)], were incorporated into a flexible PVC compound, having the following basic formulation:

| | |
|---|---|
| PVC resin | 100 parts |
| Di-isooctylphthalate (plasticiser) | 35 parts |
| β-aminocrotonate (stabiliser) | 2 parts | by blending on a two-roll mill at 175° C. The resulting compositions were compression moulded at 170° C. for 5 min at a pressure of $80 \times 10^3$ Pa.

In order to assess whether the novel coated powders exhibit any significant improvements in fire-retardant performance over conventional additives, PVC compositions containing $Mg(OH)_2$ itself, or simple mixtures of either $SnO_2 + Mg(OH)_2$ or $ZHS + Mg(OH)_2$, in equivalent level amounts to those present in the coated powders, were also prepared.

Fire retardancy evaluations were undertaken using the Limiting Oxygen Index (LOI)—BS 2782 (Part 1—Method 141) and Cone Calorimeter—BS 476 (Part 15), test methods. Results are given in Table 2 below:

EXAMPLE 15

Comparison has also been made of the flame-retardant efficiencies of ZHS-coated ATH powders, prepared by different methods. The coated fillers, CP12—Example 12 (prepared by urea hydrolysis, without pH adjustment) and CP13—Example 13 (prepared by urea hydrolysis, followed by pH adjustment), were incorporated into a halogen-containing polyester resin compound, having the following basic formulation:

| | |
|---|---|
| General purpose(halogen-free) polyester resin | 100 parts |
| Cereclor 70 (chlorinated paraffin wax) | 20 parts |
| Catalyst (MEK peroxide in styrene) | 2 parts |

The powdered additives were mixed into the polymer resin using a Silverson high shear mixer in order to give homogenous dispersions of the solid particles. The resin formulations were then poured into silicone rubber moulds and allowed to cure at room temperature for 16 hours, followed by post-cure at 70° C. for 3 hours.

In order to assess whether the novel coated ATH powders exhibit any significant improvements in flame-retardant performance over conventional additives, polyester resin formulations containing simple mixtures of ZHS+ATH, in equivalent level amounts to those present in the coated powders, were also prepared.

Limiting Oxygen index values for the polyester samples are given in Table 3 below:

TABLE 2

Fire retardancy evaluation of flexible PVC compositions

| Sample (phr on PVC resin) | LOI* | Peak rate of heat release (kW/m$^2$)** | Average rate of heat release to 3 min (λW/m$^2$)** | Smoke Parameter (MW/kg)** |
|---|---|---|---|---|
| Control: no additives | 25.4 | 239 | 204 | 210 |
| 20 phr $Mg(OH)_2$ | 26.8 | 220 | 162 | 120 |
| 1.8 phr $SnO_2$ + 18.2 phr $Mg(OH)_2$ | 29.0 | not determined | not determined | not determined |
| 20 phr $SnO_2$-coated $Mg(OH)_2$ (CP2) | 29.1 | — | — | — |
| 2 phr ZHS + 18 phr $Mg(OH)_2$ | 28.1 | 196 | 152 | 62 |
| 20 phr ZHS-coated $Mg(OH)_2$ (CP9) | 28.8 | 182 | 135 | 70 |
| 50 phr $Mg(OH)_2$ | 28.4 | 207 | 157 | 79 |
| 4.5 phr $SnO_2$ + 45.5 phr $Mg(OH)_2$ | 32.3 | not determined | not determined | not determined |
| 50 phr $SnO_2$-coated $Mg(OH)_2$ (CP2) | 33.3 | — | — | — |
| 5 phr ZHS + 45 phr $Mg(OH)_2$ | 32.4 | 188 | 113 | 56 |
| 50 phr ZHS-coated $Mg(OH)_2$ (CP9) | 33.9 | 162 | 94 | 40 |

*Higher LOI values are indicative of increased flame retardancy.
**Cone Calorimeter operated at 50 kW/m$^2$ incident heat flux; lower values of heat release rates and Smoke Parameter represent less fire hazard.

Significant improvements in fire retardancy are given by the novel coated powders compared to equivalent levels of either $Mg(OH)_2$ alone, or mixtures of the corresponding tin compound with $Mg(OH)_2$. This increased activity is believed to arise from the superior dispersion of the active tin species in the compositions containing the coated powders.

Furthermore, 20 phr of CP9 (or of CP2) gives equivalent or better fire retardancy than 50 phr of $Mg(OH)_2$. This observation is of considerable importance since the marked reduction in filler loading associated with using the coated materials would be expected to result in a significant improvement in the physical properties of the polymer composition.

TABLE 3

LOI values for polyester resin formulations

| SAMPLE | LOI |
|---|---|
| Control: no filler | 21.6 |
| 20 phr CP12 | 25.3 |
| 20 phr CP13 | 25.5 |
| 2 phr ZHS + 18 phr ATH | 24.7 |
| 40 phr CP12 | 26.6 |
| 40 phr CP13 | 27.4 |
| 4 phr ZHS + 36 phr ATH | 25.3 |

Significant improvements in flame retardancy are given by the coated fillers CP12 and CP13 compared to equivalent level mixtures of ZHS+ATH. In addition, it is evident that CP13, prepared by urea hydrolysis followed by pH adjustment, is at least as effective (and, at higher loadings, even superior) to CP12, prepared by the standard urea hydrolysis route.

What is claimed is:

1. A process for the preparation of a fire-retardant material which comprises a particulate inorganic filler (other than a tin compound) coated with a layer of a divalent metal hydroxystannate or a divalent metal stannate, which process comprises the steps of:

(i) forming a slurry of the particulate inorganic filler in an aqueous solution of an alkali hydroxystannate, which also contains a divalent metal oxide dissolved therein and reacting the slurry with a hydrolysing agent; or (ii) reacting a slurry of the particulate inorganic filler in an aqueous solution of an alkali hydroxystannate with a water-soluble source of a divalent metal, to form a layer of a divalent metal hydroxystannate on the surface of the filler; and (iii) optionally, heating the filler coated with hydroxystannate in step (i) or step (ii) in order to convert it to the corresponding divalent metal stannate.

2. A process as claimed in claim 1 wherein the hydrolysis reaction is carried out by the use of urea, nitric acid or hydrochloric acid as the hydrolysing reagent.

3. A process as claimed in claim 2 wherein urea is used as the hydrolysing reagent and the hydrolysis is carried out at a temperature of about 85° C.

4. A process as claimed in claim 2 wherein nitric acid or hydrochloric acid is used as the hydrolysing agent and the acid is added to the slurry until a pH of about 7 is reached.

5. A process as claimed in claim 1 wherein in step (ii) a soluble salt of zinc, magnesium, calcium, strontium, barium, iron, cobalt, nickel or copper is added to the slurry.

6. A process as claimed in claim 1 wherein in step (iii) the filler coated with hydroxystannate is heated to a temperature in the range of from 250° to 400° C.

7. A polymer composition comprising a polymeric material and a fire-retardant material obtained by a process as claimed in any one of claims 1 to 6.

8. A polymer composition as claimed in claim 7 which comprises from 5 to 400% by weight, based on the polymeric material, of the fire-retardant material.

9. A polymer composition as claimed in claim 8 which comprises from 20 to 200% by weight, based on the polymeric material, of the fire-retardant material.

* * * * *